United States Patent [19]
Hicks et al.

[11] 3,780,871
[45] Dec. 25, 1973

[54] DISPOSABLE LINER FOR COFFEE FILTER BASKET

[76] Inventors: Tommie Earl Hicks, Star Route, P.O. Box 22D; Lavern John Amestoy, P.O. Box 460, both of Conrad, Mont. 59425

[22] Filed: May 15, 1972

[21] Appl. No.: 253,274

[52] U.S. Cl.................... 210/471, 99/312, 210/482
[51] Int. Cl............................................. B01d 29/04
[58] Field of Search...................... 99/295, 310, 311, 99/312, 313; 210/238, 470, 471, 474, 476, 477

[56] References Cited
UNITED STATES PATENTS

| | | | |
|---|---|---|---|
| 2,889,049 | 1/1958 | Hauser................................. | 99/312 |
| 1,983,142 | 12/1934 | Moriya.............................. | 210/477 |
| 1,972,264 | 9/1934 | Hirschhorn ......................... | 210/471 |
| 3,357,340 | 12/1967 | Berns et al............................ | 99/295 |
| 361,489 | 4/1887 | Cornish et al. ..................... | 210/482 |

Primary Examiner—Samih N. Zaharna
Assistant Examiner—Peter A. Hruskoci
Attorney—Alexander B. Blair et al.

[57] ABSTRACT

A disposable liner for coffee filter baskets used in coffee brewing pots of the type which includes the coffee supporting basket is disclosed as a removable member having a bail attached thereto for handling the liner. The liner is formed of a non-woven fiber material of a generally cylindrical form having a horizontal bottom wall with a hole formed therein to permit the perculator conduit to extend upwardly therethrough. An aluminum foil cover encloses the side walls of the liner and is stitched thereto to add strength to the side walls. The bail is used for removing the liner and the used coffee grounds following the making of the coffee with the liner preventing any grounds from reaching the coffee cup.

4 Claims, 3 Drawing Figures

PATENTED DEC 25 1973 3,780,871

3,780,871

DISPOSABLE LINER FOR COFFEE FILTER BASKET

BACKGROUND OF THE INVENTION

Field of the Invention

The present invention relates to liners for coffee filter baskets of coffee brewing pots.

SUMMARY OF THE INVENTION

The disposable liner of the present invention includes a non-woven fibrous member having a generally cylindrical side wall covered with aluminum foil stitched thereto and a horizontal bottom wall with an opening to receive the percolator conduit therein. A bail is secured to the side walls to permit the liner to be bodily removed after the coffee is made with the coffee grounds retained therein.

The primary object of the invention is to provide a disposable liner for coffee filter baskets which provides means for disposing of the used coffee grounds while preventing grounds from reaching the coffee cup.

Other objects and advantages will become apparent in the following specification when considered in the light of the attached drawing.

DESCRIPTION OF THE PREFERRED EMBODIMENT

Figure 1:
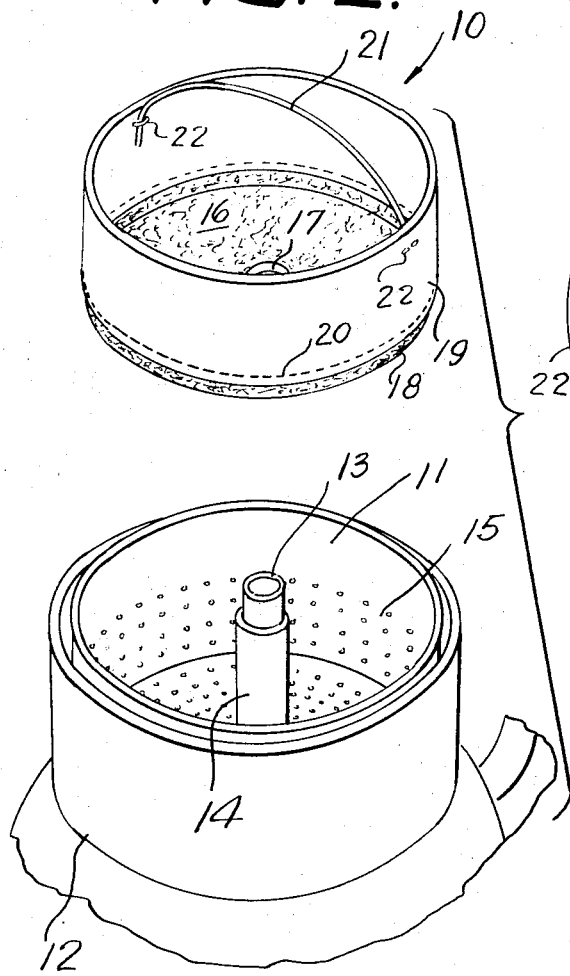
FIG. 1 is an exploded perspective view of the invention shown above the coffee brewing apparatus.
Figure 2:
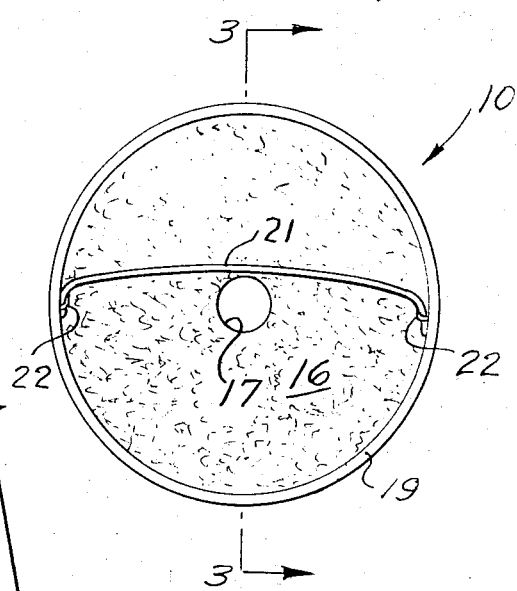
FIG. 2 is a top plan view of the liner.
Figure 3:
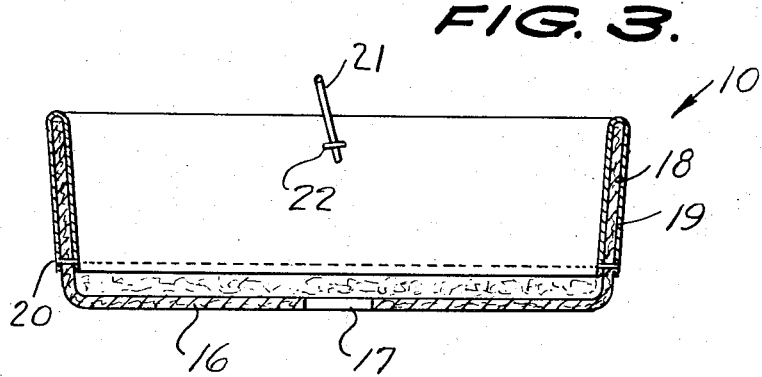
FIG. 3 is an enlarged fragmentary vertical sectional view taken along the line 3—3 of FIG. 2 looking in the direction of the arrows.

Referring now to the drawing in detail wherein like reference characters indicate like parts throughout the several figures the reference numeral 10 indicates generally a disposable liner for a coffee filter basket 11 used in a coffee brewing pot 12. The pot 12 is a perculator and has a liquid conduit 13 extending centrally upwardly therein to perculate the water when brewing coffee. A generally cylindrical coffee filter basket 11 is provided with a central conduit 14 and is adapted to engage over the conduit 13 with the coffee filter basket 11 in its normal position in the upper portion of the coffee brewing pot 12. The basket 11 has its side wall and bottom wall perforate as at 15 to permit the flow of water and to prevent the passage of most of the ground coffee.

The disposable liner 10 is formed of non-woven fiberous material and includes a generally horizontal bottom wall 16 having a central bore 17 to engage over the conduit 14 of the coffee filter basket 11. The bottom wall 16 has a side wall 18 which tapers slightly outwardly to prevent the liner 10 from becoming jammed in the basket 11. The height of the side wall 18 is substantially equal to the height of the side wall of the basket 11.

The side wall 18 is covered on its inner and outer face with an aluminum foil cover 19 which is stitched thereto at 20 so as to secure it firmly to the side wall 18. A bail 21 is secured to the side walls 18 by staples 22 at its opposite end with the bail 21 extending diametrically across the top of the liner 10.

In some coffee brewers coffee is formed by pouring the hot water over the grounds in a basket and permitting it to drip therethrough and the percolator conduit 13 is thus eliminated. When used with such coffee makers the bore 17 would be omitted from the basket 10.

In the use and operation of the invention the basket liner 10 is placed in the basket 11 and filled with ground coffee and coffee is made in the usual manner leaving the coffee grounds in the liner 10 within the basket 11. The bail 21 is then used to lift the liner 10 out of the basket 11 and it is disposed of in a suitable manner. The liner 10 prevents any of the grounds of the coffee from passing out of the basket 11 and thus prevents any of it from reaching the coffee cup.

Having thus described the preferred embodiment of the invention it should be understood that numerous structural modifications and adaptations may be resorted to without departing from the spirit of the invention.

We claim:

1. A disposable liner for use with coffee filter baskets comprising a circular bottom wall formed of non-woven fiberous material, an upstanding side wall integrally secured to the peripheral edges of said bottom wall, an aluminum foil cover engaging the inner and outer faces of said side wall, and means securing the lower edges of said aluminum foil cover to the lower portion of said side wall.

2. A device as claimed in claim 1 wherein said side wall tapers outwardly towards its top edge.

3. A device as claimed in claim 1 wherein a bail extends diametrically across said liner and means secures the opposite ends of said bail to said side walls.

4. A device as claimed in claim 1 wherein the means securing the lower edges of said aluminum foil cover to the lower portion of said side walls includes a line of stitching extending thereabout.

* * * * *